(12) United States Patent
Tompkins et al.

(10) Patent No.: US 7,302,619 B1
(45) Date of Patent: Nov. 27, 2007

(54) ERROR CORRECTION IN A CACHE MEMORY

(75) Inventors: Joseph Tompkins, Westborough, MA (US); Duncan Fisher, Mission Viejo, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 471 days.

(21) Appl. No.: 10/885,356

(22) Filed: Jul. 6, 2004

(51) Int. Cl.
*G06F 11/00* (2006.01)
(52) U.S. Cl. .......................... 714/54; 712/231
(58) Field of Classification Search .................. 714/54, 714/47, 48, 32, 37; 712/216, 219, 226, 227
See application file for complete search history.

(56) References Cited

U.S. PATENT DOCUMENTS

| | | | | |
|---|---|---|---|---|
| 4,823,252 A | * | 4/1989 | Horst et al. ..................... | 714/7 |
| 5,063,565 A | * | 11/1991 | Ohashi ........................ | 714/764 |
| 6,457,119 B1 | * | 9/2002 | Boggs et al. ................ | 712/227 |
| 6,543,028 B1 | * | 4/2003 | Jamil et al. .................. | 714/800 |
| 6,640,313 B1 | * | 10/2003 | Quach .......................... | 714/10 |
| 6,802,039 B1 | * | 10/2004 | Quach et al. ................ | 714/763 |
| 2004/0268202 A1 | * | 12/2004 | Haswell et al. ............. | 714/752 |
| 2005/0108509 A1 | * | 5/2005 | Safford et al. .............. | 712/215 |
| 2006/0123326 A1 | * | 6/2006 | Smith et al. ................. | 714/796 |

* cited by examiner

Primary Examiner—Nadeem Iqbal

(57) ABSTRACT

Various systems and methods for error correction of instructions in an instruction cache coupled to a processor are provided. In one embodiment, a plurality of instructions stored in the instruction cache are fetched for execution by the processor, each of the instructions being fetched during a respective one of a plurality of instruction cycles of the processor. Error detection is performed for each of the instructions concurrently with the fetching of a respective one of the instructions.

32 Claims, 4 Drawing Sheets

FIG. 3A

| | N | N+1 | N+2 | N+3 | N+4 | N+5 | |
|---|---|---|---|---|---|---|---|
| Cache | Fetch $I_N$ | Fetch $I_{N+1}$ | Fetch $I_{N+2}$ | Fetch $I_{N+3}$ | Fetch $I_{N+4}$ | Fetch $I_{N+5}$ | o o o |
| EC | Error Detect $I_{N-1}$ | Error Detect $I_N$ | Error Detect $I_{N+1}$ | Error Detect $I_{N+2}$ | Error Detect $I_{N+3}$ | Error Detect $I_{N+4}$ | o o o |
| Processor | Execute $I_{N-2}$ | Execute $I_{N-1}$ | Execute $I_N$ | Execute $I_{N+1}$ | Execute $I_{N+2}$ | Execute $I_{N+3}$ | o o o |
| | N | N+1 | N+2 | N+3 | N+4 | N+5 | Instruction Cycle |

FIG. 3B

| | N | N+1 | N+2 | N+3 | N+4 | N+5 | |
|---|---|---|---|---|---|---|---|
| Cache | Fetch $I_N$ | Fetch $I_N$ | Write $I_{N-1'}$ | Fetch $I_{N-1'}$ | Fetch $I_N$ | Fetch $I_{N+1}$ | o o o |
| EC | Error Detect $I_{N-1}$ | Error Correct $I_{N-1}$ | Write Back $I_{N-1'}$ | Error Detect $I_{N-1'}$ | Error Detect $I_{N-1'}$ | Error Detect $I_N$ | o o o |
| Processor | Execute $I_{N-2}$ | Stall | Stall | Stall | Stall | Execute $I_{N-1'}$ | o o o |
| | N | N+1 | N+2 | N+3 | N+4 | N+5 | Instruction Cycle |

ERROR CORRECTION IN A CACHE MEMORY

BACKGROUND

As manufacturing processes used for creating integrated circuits progress, the components created within integrated circuits such as transistors and other components continue to get smaller and smaller. On network traffic processing circuits and other circuits, such components may include storage components that are incorporated, for example, in a static RAM. The storage components may store digital information such as a logical "0" or "1". The smaller such storage components and other components become, the more susceptible they are to bit flipping due to alpha radiation. For example, alpha particles may strike a storage component such as a transistor that causes a logical "1" to flip into a logical "0" or vice versa. Such bit flipping may result in data inaccuracies and fatal errors in the operation of network traffic processors.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

FIGS. 3A and 3B show a second set of instruction cycle diagrams that illustrate the operation of the instruction cache and error correction circuitry of FIG. 1 according to an embodiment of the present invention;

DETAILED DESCRIPTION

Figure 1:
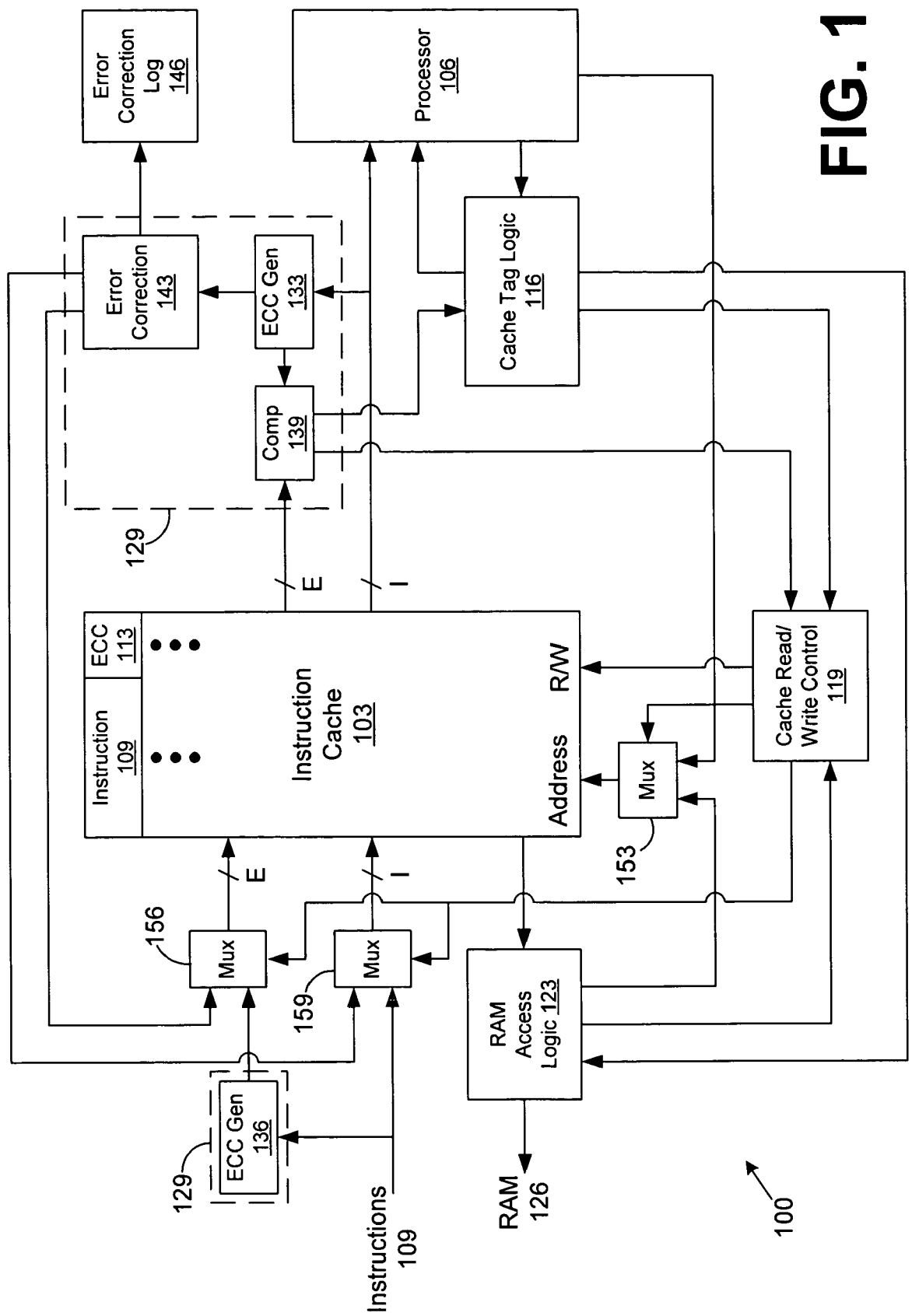
FIG. 1 is a schematic that illustrates an instruction cache with error correction circuitry employed in a traffic signal processor according to an embodiment of the present invention.

With reference to FIG. 1, shown is a portion of a processor circuit that illustrates the operation of an instruction cache with error correction according to an embodiment of the present invention. The circuit shown in FIG. 1 provides one example of various digital logic circuits that may be employed to implement the functionality described herein. In this respect, it is understood that the same functionality may be implemented with digital circuits that differ from that described herein that, nonetheless, fall within the scope of the present invention as set forth in the claims appended hereto.

In the embodiment of the present invention shown in FIG. 1, a processor circuit 100 is provided that includes an instruction cache 103 and processor 106. The instruction cache 103 is a memory for the storage of instructions 109 that are accessed and executed by the processor 106. In one embodiment, the processor circuit 100 is employed in a network traffic processor that provides for the control and processing of network traffic. In such an environment, the processor circuit 100 runs at extremely high speeds. Also, in such an environment, instruction cycles of the processor 106 may be considered a relatively scarce resource and are used in a judicious manner to accomplish the network traffic processing without a loss of data, etc. An instruction cycle is defined herein as a period of time in which the processor 106 performs a basic task such as a fetch of an instruction 109, an execution of an instruction 109, or other task. For example, the processor circuit 100 may be a Reduced Instruction Set Computing (RISC) processor in which each instruction cycle coincides with one or more processor clock cycles. Also, an instruction cycle may comprise a period of time necessary for a task to be performed that uses an amount of time equivalent the average time of instruction cycles within which the processor performs a basic tasks, where the task is performed by circuitry that operates in concert with the processor 106 such as error correction circuitry, or other circuitry as will be discussed. The time duration of an instruction cycle is measured by the number of clock ticks of an internal clock of the processor 106 that occur during the instruction cycle itself. As stated above, in a RISC processor, the instruction cycles usually coincide with a single clock cycle.

To facilitate in the proper operation of the processor circuit 100 in the network traffic processing environment, the instruction cache 103 may be, for example, a Static Random Access Memory (SRAM) or other type of appropriate memory to the extent that such memory devices can provide the high speed access to the instructions 109 as required.

Associated with each instruction 109 is error correction code 113 that is generated according to the various embodiments of the present invention. The error correction code 113 is also stored in the instruction cache 103. In addition, the processor circuit 100 includes cache tag logic 116, cache read/write control logic 119, and random access memory (RAM) access logic 123. The cache tag logic 116, cache read/write control logic 119, and the RAM access logic 123 facilitate the general operation of fetching instructions 109 from either the instruction cache 103 or from a random access memory 126 when such instructions 109 are requested by the processor 106 for execution.

In addition, the processor circuit 100 also includes error correction circuitry 129 that is executed to correct any errors in instructions 109 and in the associated error correction codes 113 that can be corrected. For example, the error correction circuitry 129 corrects single bit errors that occur due to bit flipping caused by alpha particles, etc. In this respect, the error correction circuitry 129 includes error correction code generators 133 and 136, a comparator 139, and error correction logic 143. In addition, the error correction circuitry 129 includes an error correction log 146 within which error correction events are stored as will be described. The error correction code generators 133 and 136 each generate error correction code 113 for each instruction 109 applied thereto. In this respect, each of the error correction code generators 133 and 136 may employ any one of a number of known algorithms such as, for example, Hamming codes or other codes.

The instruction cache 103 includes an address port that receives inputs from the processor 106 and the RAM access logic 123. A multiplexer 153 may be employed to discriminate between address inputs provided by the processor 106 or the RAM access logic 123 that are applied as the input to the address port. Similarly, the processor circuit 100 includes second and third multiplexers 156 and 159 that select between instructions 109 and corresponding error correction code 113 generated by the error correction code generator 136 or generated by the error correction logic 143 that are to be written to specified memory locations in the instruction cache 103 as will be described.

Next, a general discussion of the functionality of the processor circuit 100 is provided. To begin, as stated above, instructions 109 are stored in the instruction cache 103. In addition, associated with each instruction 109 in the instruction cache 103 is error correction code 113. During the course of the operation of the processor circuit 100, the processor 106 may fetch a particular instruction in a given instruction cycle. Once the desired instruction 109 in fetched by the processor 106, the instruction 109 may be executed by the processor 106.

In order to fetch a particular instruction 109, the processor 106 provides an instruction request to the cache tag logic 116. In this respect, the request may be, for example, an address of a particular instruction 109 that identifies the instruction sought. The cache tag logic 116 determines whether the requested instruction 109 is currently stored in the instruction cache 103. Specifically, the cache tag logic 116 maintains a list of all instructions 109 that are stored in the instruction cache 103. When the processor 106 attempts to fetch an instruction during a particular instruction cycle, the cache tag logic 116 receives the address information from the processor and determines whether the instruction sought by the processor 106 is currently stored within the instruction cache 103. A "cache hit" is the circumstance where the processor 106 requests an instruction 109 that is determined by the cache tag logic 116 to be stored in the instruction cache 103. A "cache miss" is the circumstance where the processor 106 requests an instruction 109 that is determined by the cache tag logic 116 not to be stored in the instruction cache 103. Upon an occurrence of a cache hit, the cache tag logic 116 initiates a read operation where the desired instruction 109 is provided to the processor 106.

To implement the read operation, the processor 106 supplies an address to the address port of the instruction cache 103 through the multiplexer 153 to indicate which instruction 109 is requested by the processor 106. If the desired instruction 109 is currently stored in the instruction cache 103, then the cache tag logic 116 causes the cache read/write control logic 119 to place the read/write port of the instruction cache 116 into a read state. Also, the cache read/write control 119 causes the multiplexer 153 to supply the address from the processor 106 to the address port of the instruction cache 103. Thereafter, the instruction 109 from the instruction cache 103 sought by the processor 106 is supplied to the processor 106 on the instruction bus I. Also, the error correction code 113 associated with the desired instruction 109 is supplied to the comparator 139. The instruction 109 placed on the instruction bus I is provided to the error correction code generator 133 as will be described.

On the other hand, when a cache miss occurs, the cache tag logic 116 directs the RAM access logic 123 to obtain the instruction 109 from the RAM 126. Once the instruction is obtained from the RAM 126, then the RAM access logic 123 supplies the appropriate address for storage in the instruction cache 103 to the address port of the instruction cache 103 through the multiplexer 153. Also, the RAM access logic 123 causes the cache read/write control 119 to place the instruction cache 103 in a write state. The cache read/write control logic 119 also causes the multiplexers 156 and 159 to direct the instruction 109 received from the RAM 126 and the error correction code 113 generated by the error correction code generator 136 to the instruction cache 103. In this respect, the desired instruction and error correction code 113 generated therefrom is stored in the instruction cache 103 to be passed on to the processor 106 as requested by the processor 106 during a particular fetch operation.

Thus, every time an instruction 109 is obtained from the RAM 126 to be written to the instruction cache 103, corresponding error correction code 113 is generated by the error correction code generator 136 for the instruction 109 and stored in the instruction cache 103 in association with the instruction 109. As described above, from time to time an error may exist in an instruction 109 or its associated error correction code 113 stored in the instruction cache 103. Such an error may exist due to bit flipping resulting from a collision between a memory component such as a transistor in the instruction cache 103 and an alpha particle. Alternatively, it may be the case that a particular transistor employed to store a bit of information in the instruction cache 103 may be defective thereby resulting in an erroneous flipping of a bit of an instruction 109 or its associated error correction code 113.

Such undesirable bit flipping may result in various error conditions in the processor circuit 100 including fatal errors and other errors that result in faulty operation and many times may require the processor circuit 100 to be restarted, etc. Due to such circumstances, it is possible that much of the data that is to be processed through the network traffic processor employing the processor circuit 100 may be lost or corrupted.

Network traffic processors that employ the processing circuit 100 typically process extremely large amounts of data to facilitate the transport of data from point to point on a network within prescribed transport constraints as can be appreciated with those with ordinary skill in the art. In such conditions, the operation of the processor circuit 100 is extremely fast. In this respect, the instruction cache 103 may comprise, for example, static random access memory (SRAM). By virtue of the fact that the instruction cache 103 comprises static RAM, the processor 106 may obtain instructions 109 in a timely manner so that the processor 106 may keep up with the data processing load that it performs. Under these conditions, the error correction function is performed in such a manner so as to minimize the number of instruction cycles of the processor 106 that may be needed to perform the error correction functions as will be described. By minimizing the number of instruction cycles needed by the processor 106 to perform error correction, then a greater number of instruction cycles are available for the processor 106 to execute instructions 109 and perform the tasks with which the processor 106 is charged.

According to one embodiment of the present invention, in order to minimize the number of instruction cycles that may be necessary to correct errors within the instructions 109 and their associated error correction codes 113, the detection of any error within an instruction 109 or its associated error correction code 113 is performed concurrently with a fetch of one of the respective instructions 109 during an instruction cycle within which the fetch operation is performed or during a subsequent instruction cycle as will be described. Specifically, the detection of an error in an instruction 109 and its associated error correction code 113 is performed within the time period of the current instruction cycle within which a fetch of the respective instruction 109 is implemented or during the time period of a subsequent instruction cycle within which a fetch of a subsequent instruction 109 or other processor operation is performed.

In order to determine whether a cache hit or miss has occurred for a particular instruction 109, the processor 106 checks with the cache tag logic 116 to determine whether the respective instruction 109 is currently stored in the instruction cache 103. At the same time, the processor 106 applies the address of the desired instruction 109 to the address port of the instruction cache 103. In this respect, the instruction 109 located at the supplied address is then made available on the instruction bus I and the corresponding error correction code 113 is made available on the error correction bus E. Meanwhile, the cache tag logic 116 determines whether a cache hit or a cache miss has occurred. In this respect, it may be the case that the instruction 109 located at the supplied address is not the instruction 109 sought by the processor 106. While the cache tag logic 116 makes this determination, the error correction generator 133 receives the instruction 109 from the instruction bus I and generates corresponding error correction code therefrom. This error correction code is supplied to the comparator 139.

When the instruction 109 is placed on the instruction bus I, its associated error correction code 113 is also placed on the error correction code bus E. In this manner, this error correction code 113 is supplied to the comparator 139. The comparator 139 can then determine whether the error correction code generated by the error correction code generator 133 matches the error correction code 113 obtained from the instruction cache 103. In this respect, if a mismatch occurs, then at least one or more bits has been flipped in the instruction 109 or the error correction code 113 stored in the instruction cache 103. According to one embodiment of the present invention, the determination as to whether an error exists in an instruction 109 and its associated error correction code 113 is performed within the time period of the instruction cycle within which the fetch of the particular instruction 109 is executed or within the time period of a subsequent instruction cycle concurrently with a fetch of a subsequent instruction or with the performance of some other processor operation.

If the error detected in the instruction 109 or corresponding error correction code 113 involves the flipping of a single bit, then the error correction circuitry 129 within the processor circuit 100 is configured to correct the flipped bit and write back the corrected instruction 109 and its associated error correction code 113 to the instruction cache 103. In one approach, the corrected instruction 109 and its associated error correction code 113 is written over the instruction 109 and error correction code 113 that include the error.

To explain further, once the comparator 139 detects the flipping of a single bit in either the instruction 109 or the error correction code 113, then the comparator 139 communicates the fact that the instruction 109/error correction code 113 needs to be corrected to the cache tag logic 116. In such case, the cache tag logic 116 causes the processor 106 to stall for a predefined number of instruction cycles to allow the instruction 109 and accompanying error correction code 113 to be corrected by the error correction circuitry 129.

However, if the comparator 139 determines that more than a single bit has been flipped, then such an error is typically not recoverable using the various types of error correction codes. Thus, if more than one bit had been flipped, thereby resulting in an unrecoverable error to the instruction 109 or a corresponding error correction code 113, then a new copy of the respective instruction 109 is obtained from the RAM 126. Given that it is relatively rare that more than a single bit is flipped in a given instruction 109 and it associated error correction code 113, the error correction circuitry 129 corrects most bit flipping errors that occur.

If more than one bit has been flipped in either the instruction 109 or the error correction code 113, or a combination of both, then the comparator 139 communicates to the cache tag logic 116 that an unrecoverable error has been detected. In such case, the cache tag logic 116 reacts by placing the processor circuit 100 in a cache miss state. In such a case, the cache tag logic 116 then proceeds to direct the RAM access logic 123 to obtain a copy of the instruction 109 from the RAM 126 as was described above.

Assuming that the error detected by the comparator 139 is the flipping of a single bit in either the instruction 109 or the error correction code 113, then the error correction logic 143 proceeds to generate a corrected version of the instruction 109 and its associated error correction code 113. In one embodiment, the generation of a corrected version of the instruction 109 and its corresponding error correction code 113 is performed in an instruction cycle that is subsequent to the instruction cycle of the fetch operation within which the error was detected as described above. Thereafter, the corrected version of the instruction 109 and its associated error correction code 113 are written back to the instruction cache 103 through the multiplexers 156 and 159 as shown.

As previously mentioned, in one embodiment, the corrected version of the instruction 109 and its associated error correction code 113 are written over the corrupted version of the instruction 109 and the corresponding error correction code 113 currently stored in the instruction cache 103. Thereafter, the corrected instruction 109 is provided to the processor 106. The function of writing back the corrected version of the instruction to the instruction cache 103 may be performed, for example, during an instruction cycle that is subsequent to the instruction cycle within which the error correction is performed as described above. During the instruction cycles in which the error correction is performed and the corrected version of the instruction 109 and error construction code 113 are written back to the instruction cache 103, the processor 106 is stalled while it waits for the corrected instruction 109. Once a correct version of the instruction 109 is supplied to the processor 106, the stalling of the processor 106 is ended and the processor 106 proceeds with executing the correct version of the instruction 109.

Thus, the correction functions performed by the error correction circuitry 129 as described above provide a significant advantage in that single bit flipping errors detected in various instructions 109 and their associated error correction codes 113 may be corrected within a few instruction cycles and without seriously hampering the operation of the processor 106 in executing the instructions 109. Specifically, the number of instruction cycles that are necessary to correct a corrupted instruction 109 (i.e. the number of instruction cycles within which the processor is stalled) in the instruction cache 109 are minimized.

Since the instruction 109 and its associated error correction code 113 are corrected in the instruction cache 103, then the correction of the error is only performed a single time. This contrasts with some approaches to error correction in which an instruction 109 is corrected each time it is read from the instruction cache 103 before it is provided to the processor 106. Specifically, without the function of writing back the corrected version of an instruction 109 and the associated error correction code 113 to the instruction cache 103, the same error would be detected every single time the instruction 109 and corresponding error correction code 113 was read from the instruction cache 103, thereby requiring such instruction 109 and error correction code 113 to be corrected each time the instruction 109 was accessed by the processor 103. Thus, without a write back function included in the error correction circuitry 129, the processor 106 would be stalled repeatedly while appropriate corrections were made every single time the respective instruction 109 was accessed, thereby slowing the functionality of the processor 106. In a traffic signal processor, such delays may result in the loss of data. Thus, the write back function serves to minimize the time that an instruction cache 103 has been stalled for error correction.

In addition, each time the error correction logic 143 corrects a detected error in an instruction 109, the error correction logic 143 writes a log entry that describes the correction event to the error correction logic 146. In this respect, the log entry may identify, for example, the particular bit that was flipped as well as any other pertinent information. This provides useful information to a user that may be helpful in determining, for example, whether the instruction cache 103 includes a faulty transistor or other component. Specifically, if the same error occurs repeatedly, then it is unlikely that the underlying bit flipping would be due to bombardment of alpha particles which is typically random in nature. Rather, such errors are more likely to be caused by a single faulty transistor or other component.

Figure 2A:
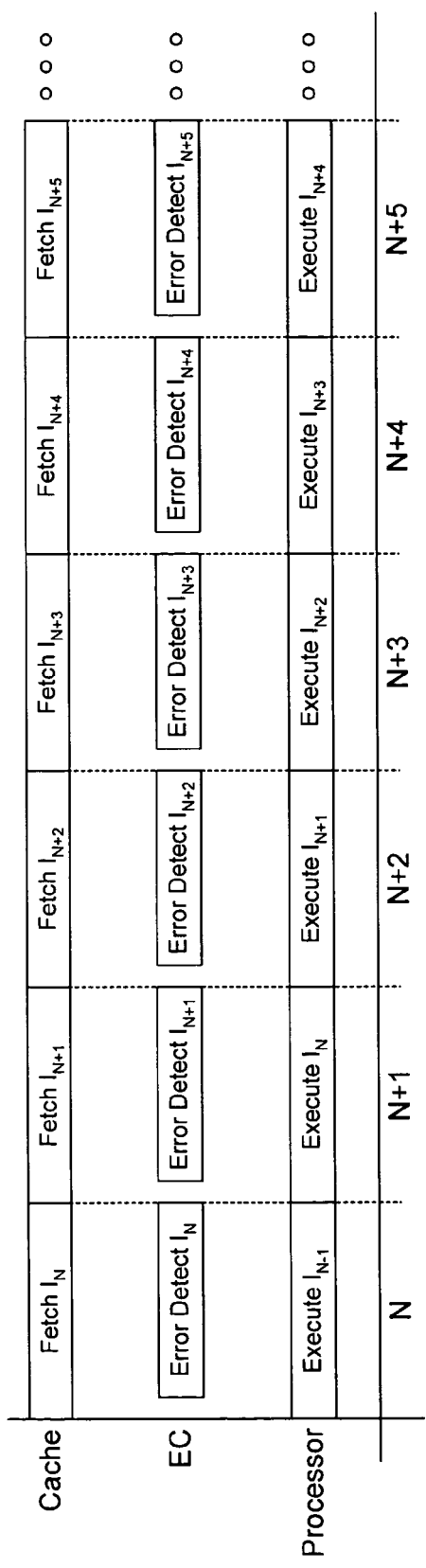
FIGS. 2A and 2B show a first set of instruction cycle diagrams that illustrates the operation of the instruction cache and error correction circuitry of FIG. 1 according to an embodiment of the present invention.

With reference to FIG. 2A, shown is an instruction cycle diagram that illustrates the timing of the various operations performed by the instruction cache 103, the error correction circuitry 129, and the processor 106 during consecutive instruction cycles N of the processor 106 according to an embodiment of the present invention. The instruction cycle diagram of FIG. 2A illustrates the condition in which no errors are detected in the instructions 109 (FIG. 1) obtained from the instruction cache 103 during the normal course of operation of the processor circuit 100 (FIG. 1). For each instruction cycle N, the $N^{th}$ instruction is fetched by the processor 106 (FIG. 1). Concurrently during the same instruction cycle N, error detection is performed on the $N^{th}$ instruction 109. The time period within which error detection is performed for each instruction is smaller than each of the instruction cycles as shown since there is a small period of time within which the instructions 109 and error correction codes 113 are placed onto the instruction bus I (FIG. 1). Meanwhile, the processor 106 executes the instruction 109 that was fetched during the prior instruction cycle N−1. In this manner, while no errors are detected, the processor 106 executes instructions 109 in consecutive instruction cycles while error detection is performed concurrently with the fetching of the next instruction 109 to be executed within each instruction cycle. In this respect, the error detection does not interrupt the execution of the instructions 109 on the part of the processor 106.

Figure 2B:
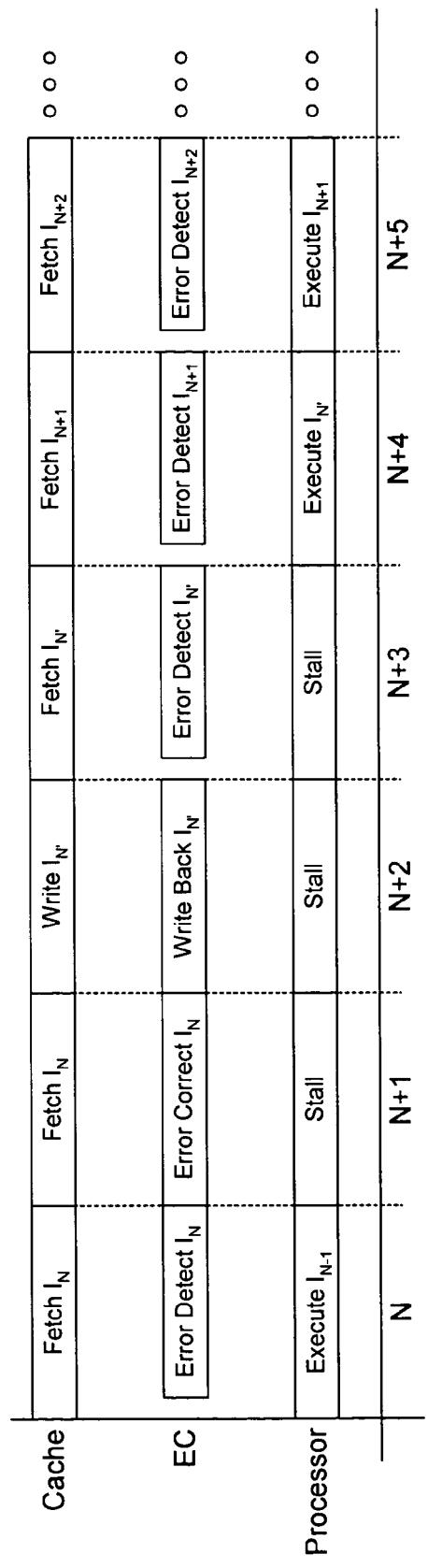

With reference to FIG. 2B, shown is an instruction cycle diagram that illustrates the progression of instruction cycles of the processor circuit 100 in which an error is detected in an instruction 109 (FIG. 1) and is corrected by the error correction circuitry as described with reference to FIG. 1. In this respect, at instruction cycle N, a fetch of an instruction 109 is implemented and error detection of the same instruction 109 is performed by the error correction circuitry 129 (FIG. 1) as described above. Also, at instruction cycle N, the instruction 109 fetched in the instruction cycle N−1 is executed.

Due to the fact that an error is detected in the instruction 109 (denoted as $I_N$) fetched during instruction cycle N, then the processor 106 is stalled at instruction cycle N+1 while the error correction circuitry 129 generates a corrected version of the particular instruction 109 (denoted as $I_{N'}$) and its associated error correction code 113 (FIG. 1). During instruction cycle N+2, the processor 106 remains stalled while the corrected instruction 109 (denoted as $I_{N'}$) is written back to the instruction cache 103 (FIG. 1). Then, in instruction cycle N+3, a fetch of the corrected version of the instruction 109 is implemented and error detection is concurrently performed on the corrected version of the instruction 109. During the instruction cycle N+3, the processor 106 remains stalled since it has yet to receive an instruction 109 to execute. Finally, in instruction N+4, the processor 106 executes the corrected version of the instruction 109. At the same time, a fetch of the next instruction 109 is performed. Also, error detection of the fetched instruction 109 is simultaneously performed. Thereafter, the processor circuit 100 resumes normal operation until the next error is detected.

With reference to FIG. 3A, shown is an instruction cycle diagram that illustrates the timing of the various operations performed by the instruction cache 103, the error correction circuitry 129, and the processor 106 during consecutive instruction cycles N of the processor 106 according to another embodiment of the present invention. Once again, the instruction cycle diagram of FIG. 3A illustrates the condition in which no errors are detected in the instructions 109 (FIG. 1) obtained from the instruction cache 103 during the normal course of operation of the processor circuit 100 (FIG. 1). For each instruction cycle N, the $N^{th}$ instruction is fetched by the processor 106 (FIG. 1). Concurrently during the same instruction cycle N, error detection is performed on the $(N-1)^{th}$ instruction 109. Since the error detection is performed for each instruction in an instruction cycle that is subsequent to the instruction cycle within which each respective instruction was fetched, the entire time period of the instruction cycle may be used for error detection. Thus, this embodiment facilitates faster processing given that there may not be enough time in each of the instruction cycles for error correction of an instruction concurrently with the fetch of the same instruction in the same instruction cycle as described above with reference to FIGS. 2A and 2B.

Meanwhile, the processor 106 executes the instruction 109 that was fetched during the prior instruction cycle N−2. In this manner, while no errors are detected, the processor 106 executes instructions 109 in consecutive instruction cycles while error detection is performed concurrently with the fetching of instructions as shown. In this respect, the error detection does not interrupt the execution of the instructions 109 on the part of the processor 106.

With reference to FIG. 2B, shown is an instruction cycle diagram that illustrates the progression of instruction cycles of the processor circuit 100 in which an error is detected in an instruction 109 (FIG. 1) and is corrected by the error correction circuitry as described with reference to FIG. 1. In this respect, at instruction cycle N, a fetch of the $N^{th}$ instruction 109 is implemented and error detection of the $(N-1)^{th}$ instruction 109 is performed by the error correction circuitry 129 (FIG. 1) as described above. Also, at instruction cycle N, the instruction 109 fetched in the instruction cycle N−2 is executed.

Due to the fact that an error is detected in the instruction 109 (denoted as $I_{N-1}$) fetched during instruction cycle N−1, then the processor 106 is stalled at instruction cycle N+1 while the error correction circuitry 129 generates a corrected version of the particular instruction 109 (denoted as $I_{N-1'}$) and its associated error correction code 113 (FIG. 1). During instruction cycle N+2, the processor 106 remains stalled while the corrected instruction 109 (denoted as $I_{N-1'}$) is written back to the instruction cache 103 (FIG. 1). Then, in instruction cycle N+3, a fetch of the corrected version of the instruction 109 is implemented. In instruction cycle N+4 error detection is performed on the corrected version of the instruction 109. Also, error detection of the corrected version of the instruction may be performed during the instruction cycle N+3 when the instruction 109 and error correction code 113 are available. During the instruction cycles N+3 and N+4, the processor 106 remains stalled since it has yet to receive an instruction 109 to execute. Finally, in instruction N+5, the processor 106 executes the corrected version of the instruction 109. At the same time, a fetch of the next instruction 109 is performed. Also, error detection of the fetched instruction 109 is simultaneously performed. Thereafter, the processor circuit 100 resumes normal operation until the next error is detected.

Figure 4:
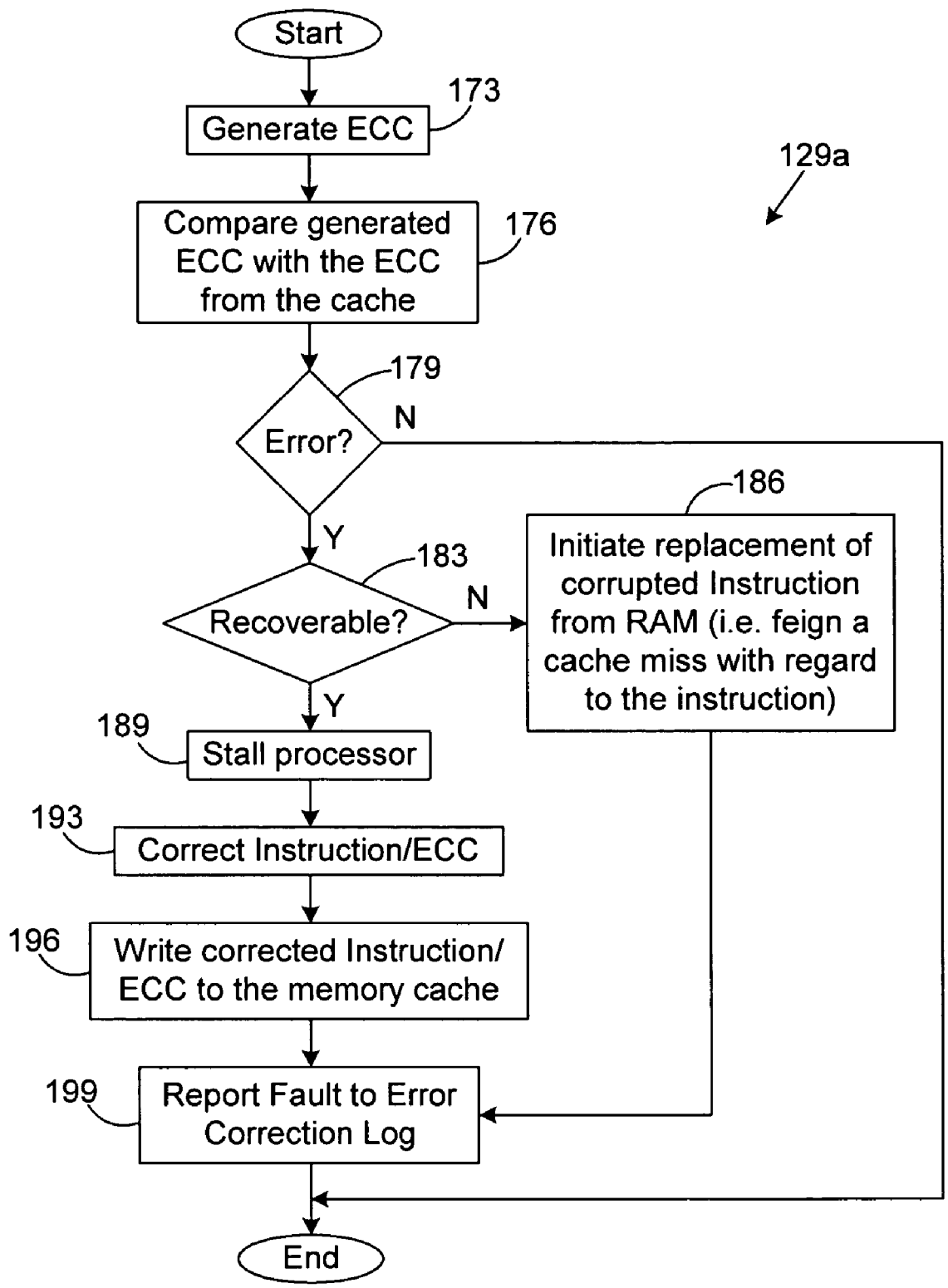
FIG. 4 is a flow chart that provides one example of error correction logic implemented by the error correction circuitry of FIG. 1 according to an embodiment of the present invention.

Referring next to FIG. 4, shown is a flow chart that provides one example of error correction logic 129a that is implemented, for example, by the error correction circuitry 129. Alternatively, the flow chart of FIG. 4 may be viewed as depicting steps of a method implemented in the processor circuit 100 (FIG. 1) in order to accomplish error correction of corrupted instructions 109 (FIG. 1) stored within the instruction cache 103 (FIG. 1) as described above.

In an additional alternative embodiment, the functionality or logic described in FIG. 4 may be embodied in the form of code that may be executed in a separate processor circuit. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow chart of FIG. 4 shows a specific order of implementation, it is understood that the order may differ from that which is depicted, depending upon various factors such as, for example, the time it takes for various circuits to complete various tasks, etc. For example, the order of two or more blocks may be scrambled relative to the order shown. Also, two or more blocks shown in succession may be executed concurrently or with partial concurrence. It is understood that all such variations are within the scope of the present invention.

Beginning with box 173, the error correction logic 129a generates the error correction code 113 (FIG. 1) associated with the current instruction 109 placed on the instruction bus I (FIG. 1). Thereafter, in box 176 the error correction logic 129a compares the generated error correction code 113 with the error correction code received from the instruction cache 103. In the embodiment described in FIG. 1, this comparison is performed by the comparator 139 (FIG. 1). Thereafter, in box 179, if an error is detected, then the error correction logic 129a proceeds to box 183. Otherwise, the error correction logic 129a ends as shown.

Assuming that the error correction logic 129a has proceeded to box 183, then the error correction logic 129a determines whether the error detected is recoverable or correctable. This may be the case, for example, if a single bit has been flipped in either the instruction 109 or in its associated error correction code 113. However, if multiple bits have flipped in the instruction 109 or its associated error correction code 113, or a combination of both, then the error is not recoverable or correctable.

Assuming that the error is not correctable or recoverable, then the error correction logic 129a proceeds to box 186. Otherwise, the error correction logic 129a proceeds to box 189. In box 189, the error correction logic 129a causes the processor to stall. Thereafter, in box 193, the error correction logic 129a generates a corrected version of the instruction 109 and its corresponding error correction code 113. Next, in box 196 the error correction logic 129a writes back the corrected instruction 109 and its corresponding error correction code 113 to the instruction cache 103. Then, in box 199, an entry is placed in the error correction log 146 (FIG. 1) that provides information regarding the nature of the error corrected. Thereafter, the operation of the error correction logic 129a ends until it is implemented for the next instruction.

With reference back to box 183, assuming that the error is not recoverable, then the error correction logic 129a proceeds to box 186 to initiate the replacement of the corrected instruction in the instruction cache 103 with a correct version of the instruction 109 from the random access memory. In this embodiment depicted in FIG. 1, this is accomplished when the comparator 139 causes the cache tag logic 116 to mimic a cache miss condition with regard to the respective instruction 109 sought by the processor 106. In this respect, the RAM access logic 123 and the cache read/write control logic 119 are controlled by the cache tag logic 116 to obtain the correct version of the instruction from the random access memory 126. Thereafter, the error correction logic 129a proceeds to box 199 to record a log entry in the error correction log 146 that details the nature of the errors detected. The various functions depicted in the flow chart of FIG. 4 are implemented during the course of the various instruction cycles as described above with reference to FIGS. 2A, 2B, 3A, and 3B described above.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A method for error correction in an instruction cache that is operatively coupled to a processor, comprising the steps of:
   fetching a plurality of instructions stored in the instruction cache for execution by the processor, each of the instructions being fetched during a respective one of a plurality of instruction cycles; and
   performing error detection for each of the instructions concurrently with the fetching of a respective one of the instructions.

2. The method of claim 1, wherein:
   a first one of the instructions is fetched during a first one of the instruction cycles; and
   the error detection is performed for the first one of the instructions during a second one of the instruction cycles that is subsequent to the first one of the instruction cycles.

3. The method of claim 2, further comprising the step of generating a corrected instruction if the error is detected in the instruction, the corrected instruction being a corrected version of the instruction.

4. The method of claim 3, wherein the step of generating the corrected instruction is performed during a third one of the instruction cycles, the third one of the instruction cycles being subsequent to the second one of the instruction cycles.

5. The method of claim 3, further comprising the step of stalling the processor during the generation of the corrected instruction.

6. The method of claim 3, further comprising the step of writing the corrected instruction back to the instruction cache.

7. The method of claim 6, wherein:
the step of generating the corrected instruction is performed during a third one of the instruction cycles, the third one of the instruction cycles being subsequent to the second one of the instruction cycles; and
the step of writing the corrected instruction back to the instruction cache is performed during a fourth one of the instruction cycles, the fourth one of the instruction cycles being subsequent to the third one of the instruction cycles.

8. The method of claim 6, wherein the step of writing the corrected instruction back to the instruction cache further comprises the step of writing the corrected instruction to the instruction cache over the instruction stored in the instruction cache.

9. The method of claim 6, further comprising the step of stalling the processor while the corrected instruction is written back to the instruction cache.

10. The method of claim 1, wherein the step of performing error detection for each of the instructions concurrently with the fetching of a respective one of the instructions further comprises the step of detecting an uncorrectable error in the instruction.

11. The method of claim 10, further comprising the step of replacing the instruction in the instruction cache with a correct version of the instruction obtained from a random access memory.

12. The method of claim 10, wherein the step of replacing the instruction in the instruction cache with the correct version of the instruction obtained from the random access memory is initiated by mimicking a cache miss condition.

13. The method of claim 1, wherein:
a first one of the instructions is fetched during a first one of the instruction cycles; and
the error detection is performed for the first one of the instructions during the first one of the instruction cycles.

14. The method of claim 13, further comprising the step of generating a corrected instruction if the error is detected in the instruction, the corrected instruction being a corrected version of the instruction.

15. The method of claim 14, wherein the step of generating the corrected instruction is performed during a second one of the instruction cycles, the second one of the instruction cycles being subsequent to the first one of the instruction cycles.

16. The method of claim 14, further comprising the step of stalling the processor during the generation of the corrected instruction.

17. The method of claim 14, further comprising the step of writing the corrected instruction back to the instruction cache.

18. The method of claim 17, wherein:
the step of generating the corrected instruction is performed during a second one of the instruction cycles, the second one of the instruction cycles being subsequent to the first one of the instruction cycles; and
the step of writing the corrected instruction back to the instruction cache is performed during a third one of the instruction cycles, the third one of the instruction cycles being subsequent to the second one of the instruction cycles.

19. The method of claim 17, wherein the step of writing the corrected instruction back to the instruction cache further comprises the step of writing the corrected instruction to the instruction cache over the instruction stored in the instruction cache.

20. The method of claim 17, further comprising the step of stalling the processor while the corrected instruction is written back to the instruction cache.

21. A system for instruction error correction, comprising:
an instruction cache;
a processor operatively coupled to the instruction cache, the processor being configured to fetch a plurality of instructions stored in the instruction cache, each of the instructions being fetched during a respective one of a plurality of instruction cycles; and
circuitry configured to detect an error in each of the instructions concurrently with the fetching of a respective one of the instructions.

22. The system of claim 21, wherein the circuitry is further configured to generate a corrected instruction if the error is detected in the instruction, the corrected instruction being a corrected version of the instruction.

23. The system of claim 22, wherein the circuitry stalls the processor during the generation of the corrected instruction.

24. The system of claim 22, wherein the circuitry is further configured to write the corrected instruction back to the instruction cache.

25. The system of claim 24, wherein the circuitry stalls the processor while the corrected instruction is written back to the instruction cache.

26. The system of claim 21, wherein the circuitry is further configured to determine whether the error in the instruction is correctable.

27. The system of claim 26, wherein the circuitry is further configured to replace the instruction in the instruction cache with a correct version of the instruction obtained from a random access memory if the error is determined not to be correctable.

28. The system of claim 26, wherein the operation of the portion of the circuitry that replaces the instruction in the instruction cache with a correct version of the instruction obtained from a random access memory if the error is determined not to be correctable is initiated by mimicking a cache miss condition.

29. A system for instruction error correction, comprising:
an instruction cache;
a processor operatively coupled to the instruction cache, the processor being configured to fetch a plurality of instructions stored in the instruction cache, each of the instructions being fetched during a respective one of a plurality of instruction cycles; and
means for detecting an error in each of the instructions concurrently with the fetching of a respective one of the instructions.

30. The system of claim 29, further comprising means for generating a corrected instruction if the error is detected in the instruction, the corrected instruction being a corrected version of the instruction.

31. The system of claim 30, further comprising means for writing the corrected instruction back to the instruction cache.

32. The system of claim 31, further comprising means for stalling the processor during the generation of the corrected instruction and during the writing of the corrected instruction back to the instruction cache.

* * * * *